United States Patent Office 3,373,401
Patented Mar. 12, 1968

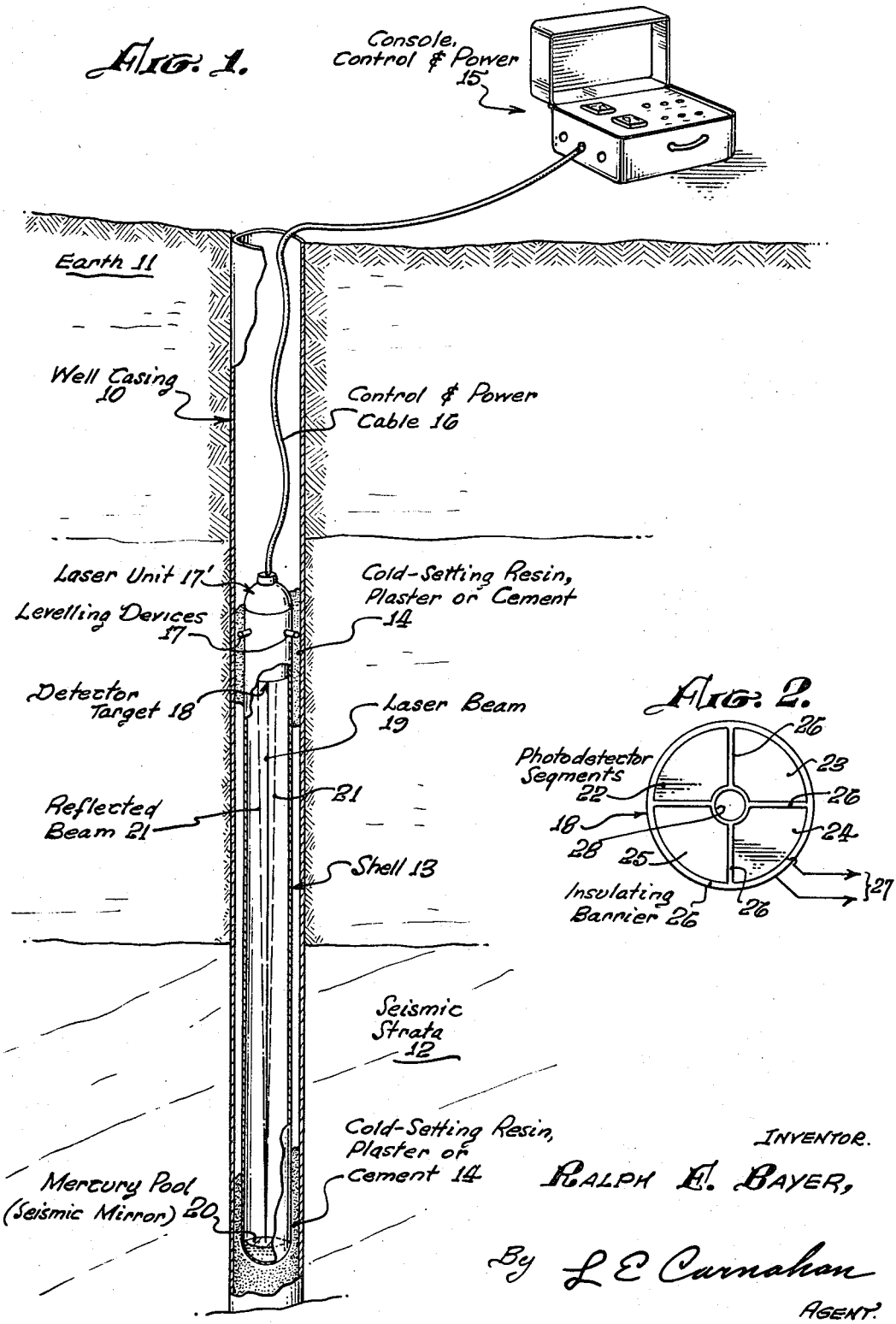

3,373,401
SEISMIC DETECTION SYSTEM
Ralph E. Bayer, Pomona, Calif., assignor to General Dynamics Corporation, a corporation of Delaware
Filed Sept. 27, 1966, Ser. No. 582,369
7 Claims. (Cl. 340—17)

ABSTRACT OF THE DISCLOSURE

Broadly, the disclosure is directed to a seismic detection system in which a laser beam is reflected from a mirror-like assembly subject to seismic agitation to a detecting assembly thereby indicating seismic variations by corresponding electrical signals. More specifically, the laser, mirror-like assembly, and detector assembly are lowered into a bore hole and are permanently fixed by embedding the same in cement, plaster, or the like. The mirror-like assembly includes a liquid mercury surface which is employed to sense seismic variations and reflect the incident laser beam accordingly. The detector assembly for analyzing reflected laser signals is comprised of a photodetector unit divided into four quadrants, for example, each separated from another by insulation. The system operates so that when no seismic variations are sensed, the laser signal is equally distributed over the four segments of the detector assembly. When seismic disturbances cause agitation of the mirror assembly, which may be made of mercury, the laser signal is reflected unequally over the detector which, in turn, produces electrical signals indicative of the direction, frequency and magnitude of the disturbing seismic displacements.

---

This invention relates to detection devices, particularly to seismic detection devices, and more particularly to a seismic detection system capable of low cost, remote sensing of earth tremors.

Various systems have been proposed for the detection and determination of seismic disturbances. With the advent of lasers, much effort has been directed to various applications of the combination of a laser, reflector and detector to determine these disturbances. An example of these prior attempts is disclosed in the Proceedings of the IEEE, January 1965, No. 1, vol. 53, pages 101 and 102.

The present invention is based upon the use of a liquid mercury metal seismic mass which has an exposed speculum surface upon which a sensing laser beam is reflected, the return image, modified by the seismic agitation of the mercury surface, is directed upon a selective detector which responds to provide an electrical output having characteristics which are relatable to disturbing influence upon the seismic element (mirror).

Therefore, it is an object of this invention to provide a seismic detection system.

A further object of the invention is to provide a detection system suitable for low cost, remote sensing of earth tremors.

Another object of the invention is to provide an exposed speculum surface upon which a sensing laser beam is reflected and the returned image is directed upon a selective detector whereby seismic disturbances are detected and determined by variations in the returned image.

Other objects of the invention, not specifically set forth above, will become readily apparent from the following description and accompanying drawings wherein:

FIG. 1 is a view illustrating an embodiment of the invention positioned for operation; and FIG. 2 is an enlarged view illustrating the detector assembly of the inventive seismic detection system.

Referring now to the drawings, a bore hole, such as well casing 10, extends through the earth layer 11 and into the seismic strata indicated at 12, as shown in FIG. 1. A casing or shell 13 is lowered into well casing 10 and permanently fixed by embedding same in cold-setting resin, plaster or cement indicated at 14. The shell 13 of a desired length is operatively connected with a control and power console 15 via a control and power cable 16. The upper end of shell 13 is provided with a plurality of levelling devices 17 which serve to position the shell 13 vertically in the well casing 10 prior to the application of retaining material 14.

At the upper end of shell 13 is located a laser unit indicated at 17', and a detector target generally indicated at 18 and shown in greater detail in FIG. 2, each of elements 17' and 18 being operatively connected to console 15. The laser unit produces a beam 19 which is directed vertically downward against a seismic mirror 20, for example, a mercury pool, located at the lower end of shell 13. The beam 19 is reflected by seismic mirror 20 and the reflected beam 21 strikes the detector target 18 for purposes described hereinafter.

As seen in FIG. 2, the detector target 18, for example, includes four identical photodetector segments 22, 23, 24, and 25 electrically isolated by narrow insulating barriers indicated at 26. Each of the photodetector segments 22–25 are provided with two-terminal output leads indicated at 27 (only one such pair of leads being shown) which are connected via cable 16 to console 15. In addition, detector target 18 is provided with a central aperture 28 through which the laser beam 19 is projected toward the seismic mirror 20.

In operation, with the inventive system installed as illustrated in FIG. 1, so long as the seismic mirror 20 is undisturbed, the reflected laser beam 21 falls equally upon the four quadrant sectors 22–25 of detector target 18 and a balanced output from each sector will result, thus indicating on console 15 an undisturbed condition in the seismic strata 12. However, a minor disturbance of the mercury speculum (mirror 20) caused by seismic disturbances will displace the reflected beam 21 resulting in a magnified return beam displacement on the sectors 22–25 of detector target 18, and thus creates an unbalanced electrical sensor output which is transmitted to the control and power console 15. Console 15 may be monitored such that a resolvable signal may be obtained which can be related to the direction, frequency and magnitude of the disturbing seismic displacement.

It has thus been shown that this invention provides a seismic detection system which provides a remote measure of small earth disturbances which could be employed to determine such features as remote explosive detonation, earth slippage, and other geophysical phenomena.

While the shell 13 has been described as being immobilized in well casing 10 by cold-setting material 14, mechanical means operatively attached to shell 13 could be utilized.

Although a particular embodiment of the invention has been illustrated and described, modifications will become apparent to those skilled in the art, and it is intended to cover in the appended claims all such modifications as come within the true spirit and scope of the invention.

What I claim is:

1. A seismic detection system comprising a laser unit, seismic mirror means, detector means, control and power console means, and means for operatively interconnecting said console means with said laser unit and said detector means, said seismic mirror means including liquid mercury and being adapted to be positioned vertically with respect to said laser unit and said detector means, whereby a beam projected from said laser unit will be directed against said seismic mirror means and reflected back to said detector means.

2. A seismic detection system comprising a laser unit, seismic mirror means, detector means, control and power console means, and means for operatively interconnecting said console means, said seismic mirror means being adapted to be positioned vertically with respect to said laser unit and said detector means, said detector means including a plurality of identical photodetector segments, said segments being electrically insulated from one another, whereby a beam projected from said laser unit will be directed against said seismic mirror means and reflected back to said detector means.

3. The seismic detection system defined in claim 2, wherein each of said photodetector segments are provided with two-terminal output leads, said leads being operatively connected with said interconnecting means.

4. The seismic detection system defined in claim 3, wherein said detector means is additionally provided with a central aperture through which the beam from said laser unit is adapted to be projected.

5. A seismic detection system comprising a laser unit, seismic mirror means, detector means, control and power console means, and means for operatively interconnecting said console means with said laser unit and said detector means, said seismic mirror means being adapted to be positioned vertically with respect to said laser unit and said detector means, whereby a beam projected from said laser unit will be directed against said seismic mirror means and reflected back to said detector means, said laser unit, said seismic mirror means and said detector means being mounted in a casing means, said casing means being provided with levelling means, said casing means being adapted to be positioned in a bore hole in the ground, levelled in such a bore hole by said levelling means such that said seismic mirror means is vertically below said laser unit and said detector means, and fixedly held in such a bore hole by suitable means.

6. The seismic detection system defined in claim 5, wherein said suitable means for fixedly holding said casing means in said bore hole is composed of cold-setting material.

7. The seismic detection system defined in claim 6, wherein said seismic mirror means includes a suitable quantity of liquid mercury.

References Cited
UNITED STATES PATENTS

| | | | |
|---|---|---|---|
| 2,007,010 | 7/1935 | Thearle | 73—71.3 |
| 2,728,220 | 12/1955 | Willner | 73—71.3 |
| 3,213,414 | 10/1965 | Moser | 340—17 |

RODNEY D. BENNETT, *Primary Examiner.*

SAMUEL FEINBERG, BENJAMIN A. BORCHELT,
*Examiners.*

P. A. SHANLEY, D. C. KAUFMAN,
*Assistant Examiners.*